(12) United States Patent    (10) Patent No.: US 7,505,256 B2
Boudreau                     (45) Date of Patent:    Mar. 17, 2009

(54) DEVICE PROVIDING PRIVACY AND SHADE FOR A DISPLAY

(76) Inventor: Andrew Boudreau, 299 N. Dunton, Apt. 323, Arlington Heights, IL (US) 60004

( * ) Notice: Subject to any disclaimer, the term of this patent is extended or adjusted under 35 U.S.C. 154(b) by 313 days.

(21) Appl. No.: 11/450,592

(22) Filed: Jun. 8, 2006

(65) Prior Publication Data

US 2006/0279916 A1     Dec. 14, 2006

Related U.S. Application Data

(60) Provisional application No. 60/689,625, filed on Jun. 10, 2005.

(51) Int. Cl.
*H05K 5/00* (2006.01)
*H05K 7/00* (2006.01)
*G06F 1/16* (2006.01)

(52) U.S. Cl. ..................................................... 361/681
(58) Field of Classification Search ................ 361/681; 359/601

See application file for complete search history.

(56) References Cited

U.S. PATENT DOCUMENTS

| 5,400,903 | A | 3/1995 | Cooley |
| D385,543 | S | 10/1997 | Phirippidis |
| D397,686 | S | 9/1998 | Bregman |
| 5,877,896 | A | 3/1999 | Gremban |
| 5,988,823 | A | 11/1999 | Wong |
| 6,046,754 | A | 4/2000 | Stanek |

*Primary Examiner*—Javaid Nasri
(74) *Attorney, Agent, or Firm*—Catalyst Law Group; David M. Kohn; Timothy W. Fitzwilliam

(57) ABSTRACT

The present invention relates to a device that provides privacy to a display. The invention works in conjunction with devices that are capable of being used in public. The display is typically part of an electronic apparatus, such as a laptop computer, portable DVD player, gaming machine and the like. The invention device includes at least a top panel and two side panels. The invention device also includes a gap bridging mechanism, which can be embodied in a variety of structures. The gap bridging mechanism bridges any gap formed between one or both side panels and the top panel resulting from the lateral or horizontal adjustment of these panels.

29 Claims, 10 Drawing Sheets

DEVICE PROVIDING PRIVACY AND SHADE FOR A DISPLAY

RELATED APPLICATIONS

This application claims the benefit of priority of U.S. Provisional Patent Application Ser. No. 60/689,625, filed Jun. 10, 2005, the disclosure of which is hereby incorporated by reference in its entirety.

FIELD OF THE INVENTION

This invention relates generally to the field of accessories for various displays. These displays are part of a computer, and more commonly are part of lap top computer. These displays are also part of other devices, such as portable DVD players, portable gaming machines and other devices employing a flat panel display. Specifically, the invention is a novel device that attaches to these displays to provide privacy and shade.

BACKGROUND

There are a variety of electronic devices having flat panel displays that are intended as portable devices for use in public. One of the more common of these types of devices is the laptop computer; however, there are a variety of other devices including the portable DVD player and portable gaming machines like the PSP Playstation by Sony Computer Entertainment, Inc. and the DS and Gameboy by Nintendo of America, Inc. The laptop computer monitor typically measures about one inch thick, though this dimension is getting smaller as technology advances. Further, technical advances in flat panel display technology are dramatically improving screen resolution.

Older displays were best viewed when the user's line of sight was perpendicular to the plane of the display. As the sight angle varied, the display content became more difficult to view, and was virtually un-viewable from the more acute angles. In a sense, poor viewability from the non-perpendicular angles offered some level of privacy of the display content. However, this type privacy is neither complete nor assured. And, as display resolution technology improves displays becoming more viewable from side angles.

The use of electronic devices having displays, particularly laptop computers, has increased dramatically as these devices become more portable, versatile, and simultaneously more powerful. Computer users are now inclined to use their computers in places previously not possible before the prevalence of laptop computers. In addition, highly confidential information is often stored on the computer. Laptop computers are now being utilized in places such as in automobiles, planes, coffee shops, or public libraries. These places provide more flexibility for users to have access to a computer. However, the surrounding environment may not always provide a suitable work area. For instance, a computer user may wish to work outside to enjoy pleasant weather, but direct sunlight to the screen or glare from the sun makes viewing the LCD difficult.

When computers are used in public places, the user is also at risk of others reading the material displayed on the screen. As display screens for portable computers become larger and larger, it becomes even more difficult to maintain privacy surrounding the information display on the screen from other individuals nearby. Particularly, passenger seats on airplanes or trains are typically in close proximity to one another. During business travel or commuting, computers are often used in transit. Passengers seated adjacent to the computer user can easily read the display screen, thereby jeopardizing privacy to the computer user. Since highly confidential information may be on the computer screen, this is problematic for the computer user.

Additionally, public transportation, as well as private transportation, can involve computers being exposed to sunlight which may affect the computer users ability to view the display. Although airplanes are equipped with shades near each passenger's window, one passenger does not have control over whether other passengers close their window shades. Other methods of transportation such as commuter trains do not normally provide shades from the sunlight. Thus, the sunlight can cause significant glare from the computer screen, making it difficult for the user to see the Display.

One approach addressing the above problems is disclosed in U.S. Pat. No. 5,400,903, issued to David M. Cooley on Mar. 28, 1995. The patent describes a notebook computer carrying case that includes a top cover, a bottom cover, and an accordion-like shroud connecting the sides of the top and bottom covers.

The above approach, while solving some problems, creates additional ones and yet leaves other problems unaddressed. For instance, since computers or other electronic devices become smaller and smaller, carrying cases are becoming obsolete. Many computer users slip these components directly in to their briefcase, their purse, or their carry-on luggage. The protective carrying cases are often left behind in the office or the home while the user is traveling. Additionally, carrying cases are large and bulky. Travelers typically minimize the amount of separate items which need to be individually carried. The protective shroud connected to the case is not adjustable lateral to the plane of the keyboard. The configuration of this invention makes typing difficult because the user's arms cannot extend out sideways from the keyboard. This difficulty is exaggerated when the top shield is used, thereby restricting horizontal movement of the hands.

A similar device is disclosed in U.S. Pat. No. 5,877,896, issued to Ronald Dean Gremban. The Gremban device is again a brief case that unfolds to provide a space having sides, bottom, top and back members, and thus making a cavern-like structure in which to place the laptop computer. The sides and top members are adjustable laterally and horizontally, respectively; however, this adjustment is limited in that the respective members must connect together. The patent discloses that the side members of the invention connect with the top member of the invention, so movement of the side members lateral to the plane of the keyboard is restricted because the side and top members would no longer connect. Again, the user's arms are restricted from extending out laterally beyond the keyboard—an unnatural typing position.

U.S. Pat. No. 6,046,754, issued to James B. Staneck discloses a laptop computer having side and top panels built into the display portion of the computer. In one embodiment, the patent describes these rigid panels as having a friction hinge allowing the side panels to adjust lateral to the plane of the keyboard and allowing the top panel to adjust horizontally to the same. The panels are retractable within the display housing. Thus, the display housing is made larger to accommodate the panels. This is undesirable because the trend for laptop computers is to make them as small as possible. Additionally, the size and shape of the panels are restricted to what will fit within the panel housing, so versatility of the panels is lost. There is also the problem with full privacy and/or shading when the panels are adjusted. As the side panels are adjusted laterally along the keyboard plane they will move away from the top panel. At the point where the side panels do not contact the top panel, a gap is then formed and privacy and shading are compromised.

While all of the aforementioned prior art constructions meet some needs within the art for which they have been specifically designed, they are uniformly deficient with respect to their failure to provide complete privacy and shading, while at the same time providing versatility with the shading device to allow for comfortable use of the display device being protected.

As a consequence, there is a need for a new and improved privacy and shading partition used with a display and the provision of such a construction is a stated objective of the present invention.

SUMMARY OF THE INVENTION

One embodiment of the present invention relates to a device that provides privacy to a display. The invention works in conjunction with devices that are capable of being used in public. The display is typically part of an electronic apparatus, such as a laptop computer, portable DVD player, gaming machine and the like. The invention device comprises at least a top panel and two side panels. The invention device also comprises a gap bridging means, which can be embodied in a variety of structures. The gap bridging means bridges any gap formed between one or both side panels and the top panel resulting from the lateral or horizontal adjustment of these panels.

The invention device attaches to an electronic apparatus proximate the electronic apparatus' display so that the device can be used to provide privacy with respect to display content. The attachment can be either permanent attachment or removable attachment. The invention device, when attached, places the side panels at the side of the display and the top panel at the top of the display. In one embodiment, the side panels comprise a friction hinge, which is preferably located on the edge of the side panel contacting the display. In an alternative embodiment, the side panels comprise a friction hinge, which does not contact the side of the display, but is rather moved further into the body of the side panel. In a further embodiment, the top panel, too, comprises a friction hinge, and that friction hinge is preferably located on the edge of the top panel that contacts the display.

The invention device provides shading of the display in addition to providing privacy.

There is also provided a method of using a device to provide privacy for a display screen, and provide versatility and comfort for the user of the device. The method employs a device of the current invention. There is further provided a method of using a device to provide shading for a display screen. The method employs a device of the current invention.

BRIEF DESCRIPTION OF THE DRAWINGS

In FIG. 7b, the hinges are within the body of left side and right side panels. In FIG. 7c, the hinges are within the pivot points connecting the left side and right side panels to the attachment member.

FIG. 8a illustrates this type of panel attachment. FIG. 8b illustrates one advantage of this type of attachment with respect to having panels with adjustable sizing.

DETAILED DESCRIPTION OF THE INVENTION

In the following detailed description, reference is made to the accompanying drawings, which form a part hereof, and in which is shown by way of illustration specific embodiments in which the invention can be practiced. These embodiments are described in sufficient detail to enable those of ordinary skill in the art to practice the invention. It is understood by these same artisans that other embodiments can be utilized and that structural changes can be made without departing from the spirit and scope of the current invention. Thus, the following detailed description is not meant to limit the breadth of the invention, which is defined by the appended claims.

Numbering Reference List.
2. Electronic Apparatus.
4. Display.
6. Display Housing.
8. Keyboard.
10. Lateral Plane Arrow.
12. Horizontal Plane Arrow.
100. Privacy Device.
102. Right Side Panel.
104. Top Side Panel.
106. Left Side Panel.
108. Attachment Member.
200. Pivot Point for Right Side Panel.
202. Pivot Point for Top Side Panel.
204. Pivot Point for Left Side Panel.
206. Pivot Point for Right Side Panel at Top Panel.
208. Pivot Point for Left Side Panel at Top Panel.
300. Right Side-Top Side Junction.
302. Left Side-Top Side Junction.
304. Right Side-Top Side Gap.
306. Left Side-Top Side Gap.
400. Right Side-Top Side Gap Bridging Means.
402. Left Side-Top Side Gap Bridging Means.
410. Retraction Housing.
412. Retracting Panel.
414. Latch Means.
500. Bridging Panel.
502. Hinge.
600. Accordion-Like Structure.
700. Adjustable Length Panel.
702. First Segment
704. Second Segment.
706. Third Segment.
708. Interior of First Segment.
710. Interior of Third Segment.
712. First Segment Stopping Means.
714. Second Segment Stopping Means.
716. Third Segment Stopping Means.
718. Second Segment Stopping Means.
800. Extension Means.
900. Right Side Panel Hinge.
902. Left Side Panel Hinge.
1000. Left Panel Segment Joint.
1002. Top Panel Segment Joint.
1004. Right Panels Segment Joint.
1006. Central Slide Rod.

As used herein, the term "privacy" means preventing or reducing unwanted viewing of the display, and also means preventing unwanted light from shining on the display. Thus, "privacy" refers to privacy, shading, privacy and shading, or generally reducing access to the display.

Figure 1A:
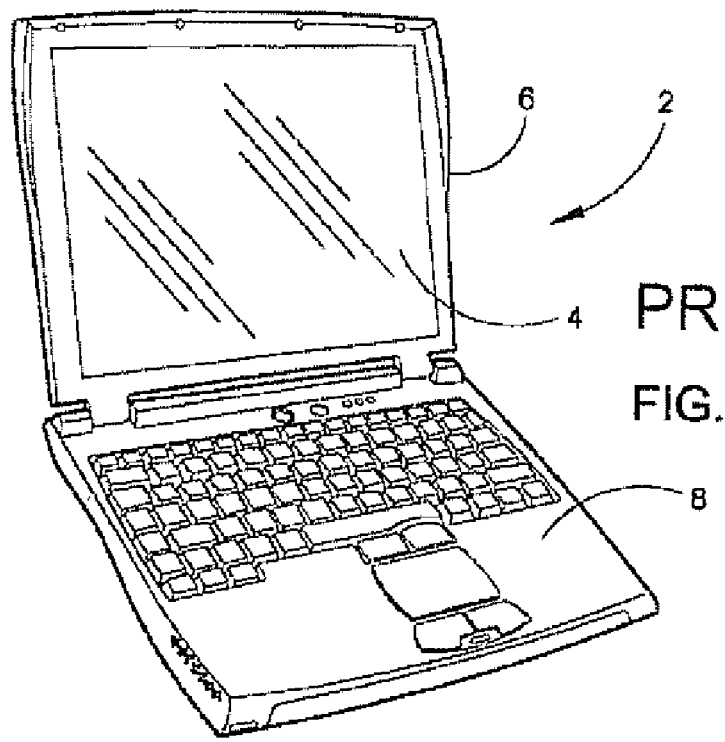
FIG. 1a is an illustration of a typical laptop computer.

FIG. 1a is an illustration of a laptop computer without the invention device attached. This illustration provides terms, with reference to the computer, that will be used in this disclosure. The terms are provided here for clarity. The electronic apparatus 2 is a laptop comprising a display 4 embedded within a display housing 6 and a keyboard 8. For simplicity, the keyboard 8 refers to the actual keyboard and the housing forming the base of the laptop. The display 4 is discussed separately from the display housing 6 because there will be times when the discussion is directed to the housing (e.g., attachment of the device to the housing) and time when the discussion is directed to the display screen (e.g., content being protected/shaded by the invention device).

Figure 1B:
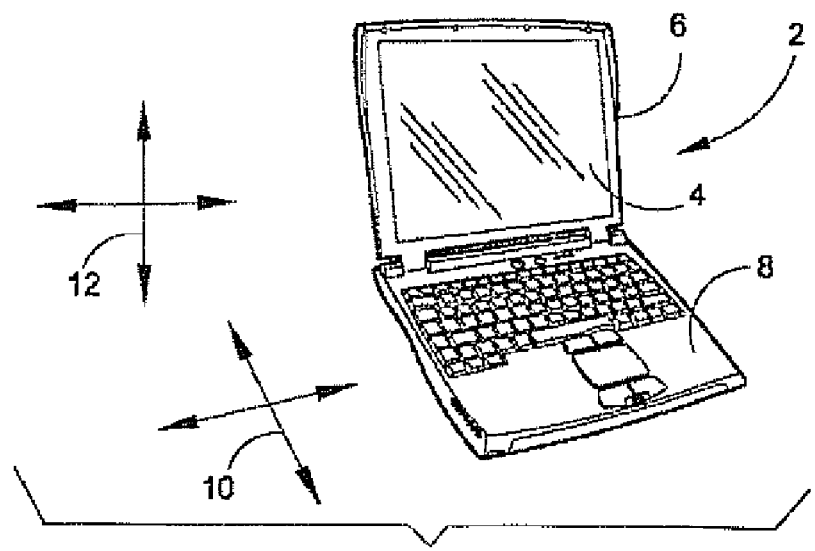
FIG. 1b depicts the horizontal plane and the lateral plane as used for reference when discussing adjustable positioning of the invention. The planes are referenced using arrows and are shown proximate a laptop computer to further illustrate the planes in relation to the laptop.

Seen in FIG. 1b are two sets of arrows representing a lateral plane and a horizontal plane. The lateral plane arrows 10 are used to refer to the dimensions lateral to the plane of keyboard 8, and the horizontal plane arrows 12 are used to refer to the dimensions horizontal to the plane of the keyboard 8. Mostly, these dimensions will be used to describe movement of the panels comprising the invention device relative to the electronic apparatus having a privacy device.

Figure 1C:
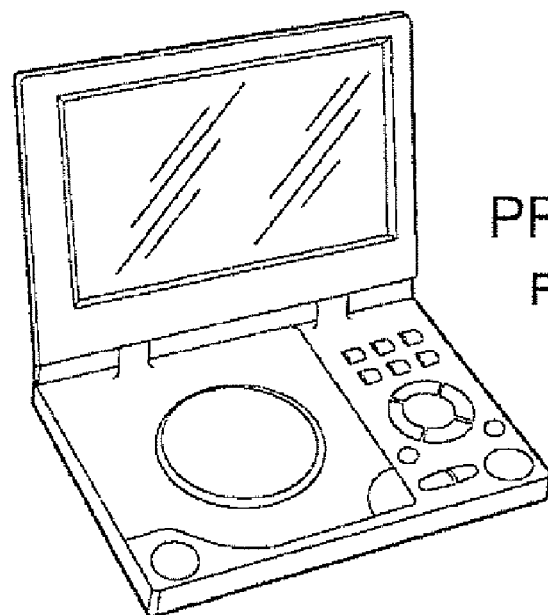
FIG. 1c illustrates a typical portable DVD player.
Figure 1D:
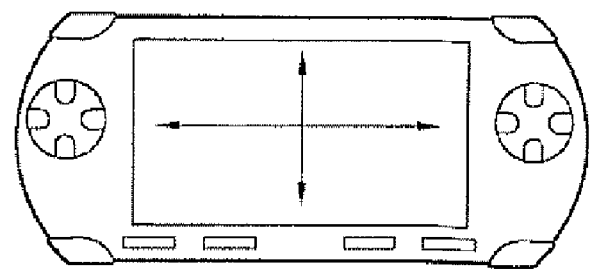
FIG. 1d illustrates a typical gaming machine.
Figure 1E:
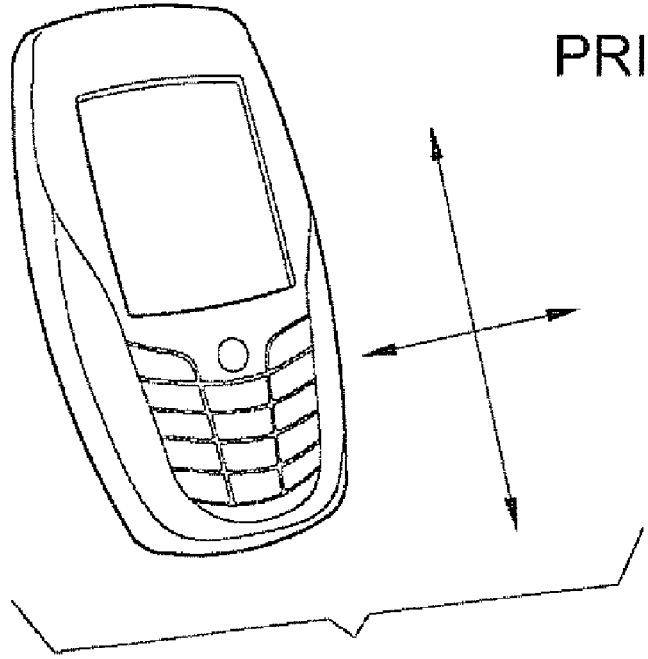
FIG. 1e illustrates a typical cellular phone.

While a laptop is being shown as the electronic apparatus used with the invention device, other electronic apparatus can be used as well. Mentioned above, these other electronic apparatus include, for example, portable DVD players and gaming machines. The portable DVD player is typically configured similar to the laptop, having a base member and a display screen member. These two members are typically pivotable about a common axis, and are generally in an L-shape when in use and needing privacy/shading. Other electronic apparatus, such as the gaming machine, are substantially flat, having a single housing with a display embedded in one area of the housing, and the control keys or knobs in a separate area of this same housing. Modern "all-in-one" telephones, also, have a means for entering data and a means for viewing data all embedded within a substantially flat housing arrangement. For these electronic apparatus, the horizontal arrow is in the plane of the substantially flat housing arrangement, while the lateral arrow is in the plane perpendicular this horizontal plane. These other devices are illustrated in FIGS. 1c, 1d and 1e.

During use, a laptop user has the display housing 6 of the laptop 2 in a generally upright position compared to the keyboard 8, as shown in FIGS. 1a and 1b. The display 4 is embedded within the display housing 6, and is viewable from positions directly in front of the display 4, as well as positions at angles left, right and above the display 4. The display 4 is viewable from a position above the display, such as viewing a screen from above a user's shoulder. Alternatively, the display 4 could be viewed from a position to the side of a computer user, such as by a person seated next to the computer user. Laptop computers are a common product, and a person of ordinary skill in the art is well aware of how a laptop is configured when in use. It is also clear to one of ordinary skill in the art how the content on the display of a laptop can be viewed by others. The present invention provides for protection to the display 4 and limits the viewability from angles other than the user's preferred position.

Figure 2A:
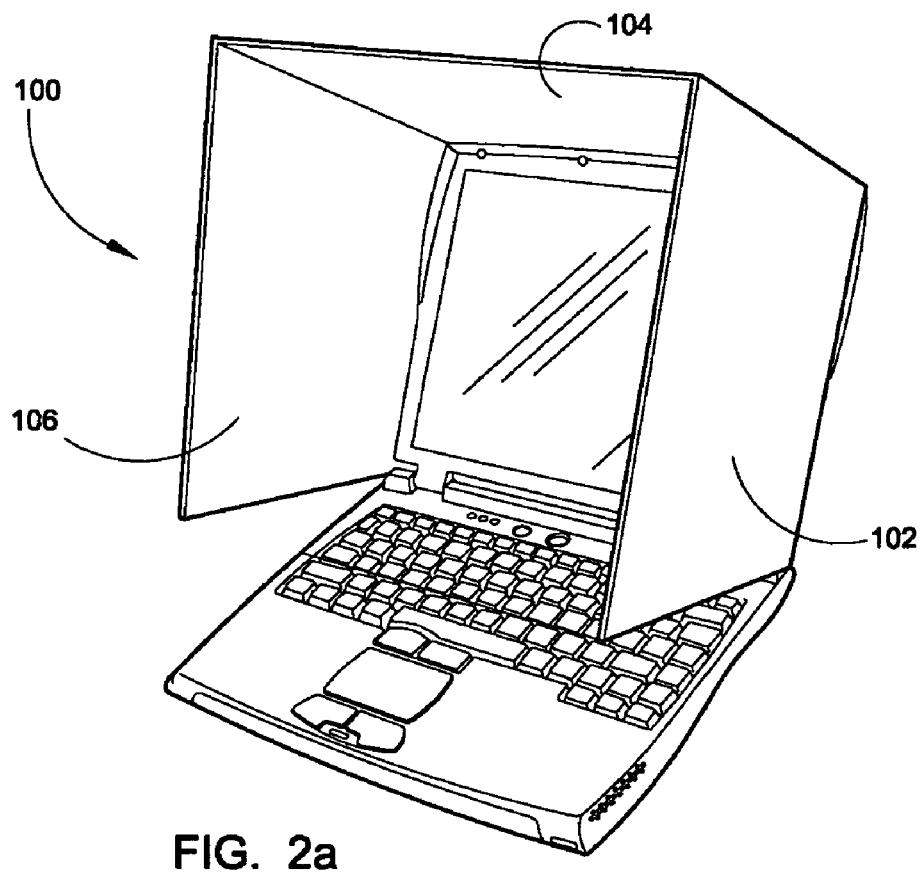
FIG. 2a illustrates the invention privacy device attached to a laptop computer and having the side panels and top panel positioned to provide privacy.
Figure 2B:
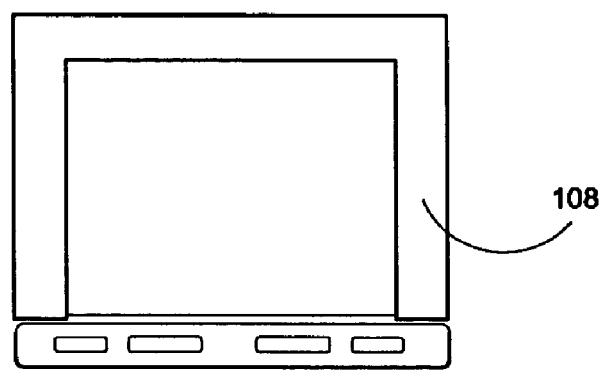
FIG. 2b illustrates the attachment of the privacy device to the back of a laptop's display housing. In this illustration, the attachment member has a border configuration.

FIG. 2a shows laptop 2 having attached the invention privacy device 100. Privacy device 100 comprises right side panel 102, top side panel 104, left side panel 106 and attachment member 108 (shown in FIG. 2b). The right side panel 102, top side panel 104, left side panel 106 are collectively referred to as adjustable privacy panels. FIG. 2b, is a view of the display housing 6 on the side opposite display 4, e.g., the back side. In the preferred embodiment, the privacy device 100 has an attachment member 108 that attaches to display housing 6 similar to a border. It is preferred that the attachment is removable; however, permanent attachment is also an option for attaching privacy device 100 to the display housing 6. If the attachment of attachment member 108 to display housing 6 is a removable attachment, then a variety of well known attachment means can be employed. Hook and loop is a simple removable attachment means that can be used. Basically, either the hook or the loop component is attached to the display housing 6, and the complementary component is attached to the attachment member 108. The attachment member 108 is then removably attached to the display housing 6 using hook and loop. Adhesives are also useful for attaching the attachment member 108 to the display housing 6. Depending on the bonding strength of this adhesive, the attachment of the attachment member 108 to the display housing 6 is either removable or permanent. The attachment of the attachment member 108 to the display housing 6 will be readily accomplished by one of ordinary skill in the art.

Figure 2C:
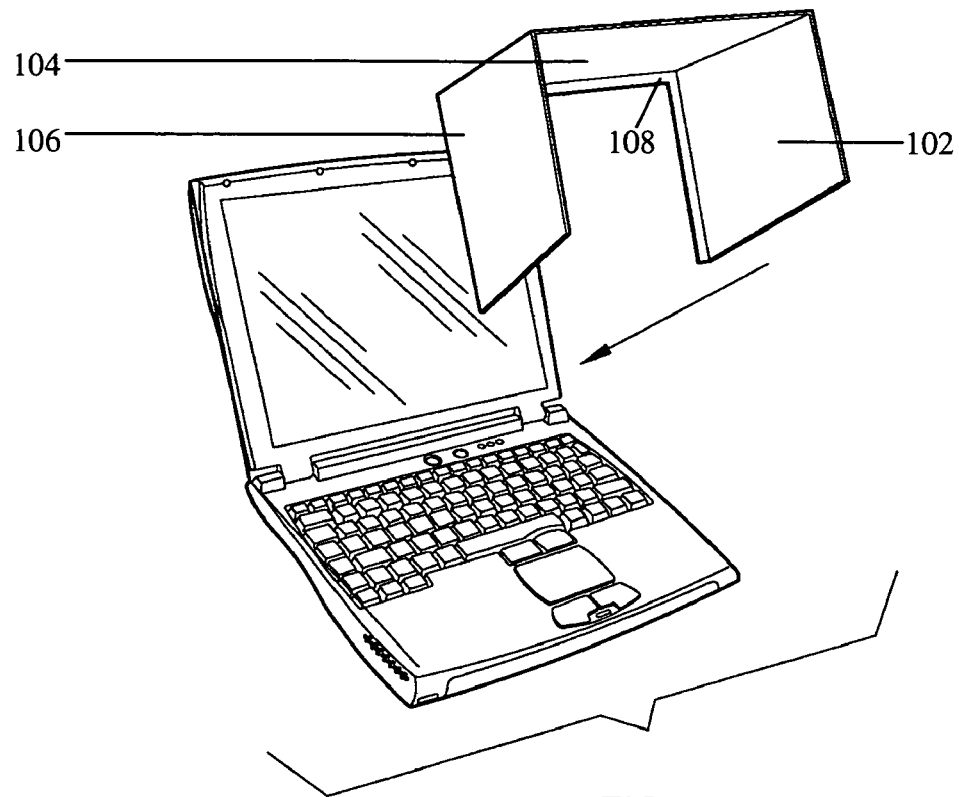
FIG. 2c illustrates the front of a display housing for a laptop and the attachment of the attachment member of the privacy device to the front of the display housing. It is illustrated in these figures that the attachment member fits onto the border of the display housing without covering the display.

When the attachment member 108 is configured like a border, as described directly above, the attachment member 108 can be attached to the front side of display housing 6. This configuration is shown in FIG. 2c. Most laptop display housings have a border made of the same material as the housing surrounding the actual display. So, in this alternative embodiment, the attachment member 108 can be attached, either permanently or removably, to this border region on the display housing 6. It is preferred that the dimensions of the attachment member 108 are equal to or less than the dimensions of the display housing 6 border so as to not obstruct the screen from the user's view.

Figure 2D:
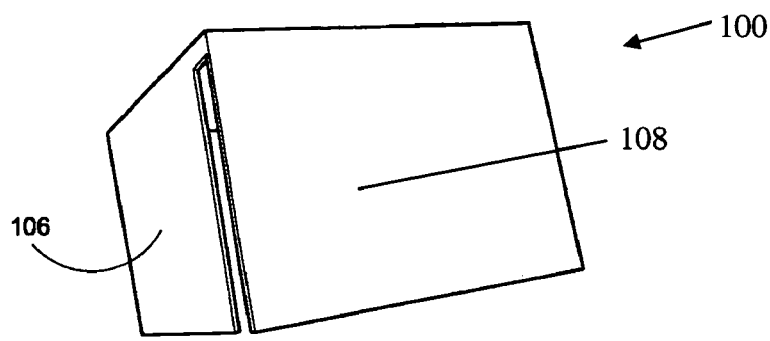
FIG. 2d illustrates the attachment of the privacy device to the back of a laptop's display housing. In this illustration, the attachment member has a square configuration

In an alternative embodiment shown in FIG. 2d, the attachment member 108 is a solid panel that is substantially the same size as the back of display housing 6, and as such, substantially covers the back side of display housing 6. The privacy device 100 is shown detached from any electronic apparatus. Attachment of attachment member 108 to the back of display housing 6 can be either permanent or removable.

Figure 3A:
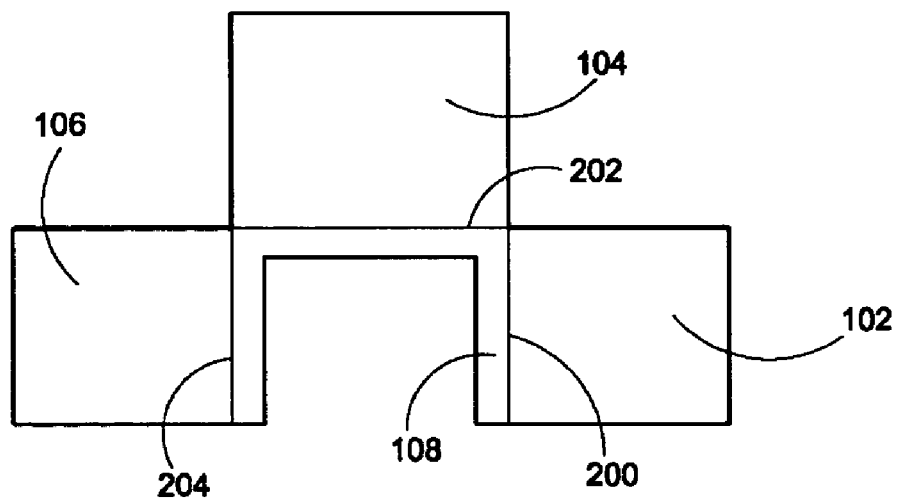
FIG. 3a illustrates the invention privacy device splayed open.

Referring now to FIG. 3, the privacy device 100 is shown, and in this view the right and left side panels 102 and 106 as well as the top side panel 104 are shown in a splayed open configuration. Right side panel 102, top side panel 104 and left side panel 106 are attached to the attachment member 108 at pivot points 200, 202 and 204, respectively. In the preferred embodiment, attachment at these pivot point is via friction hinges. Friction hinges are preferred because these hinges allow for adjustment of the sides 102, 104 and 106 relative to the attachment member 108 along the pivot points 200, 202 and 204, and these adjusted positions will be held in place by the friction hinge. Friction hinges are well know in the art, as are a variety of other pivot means that can be used at pivot points 200, 202 and 204.

Figure 3B:
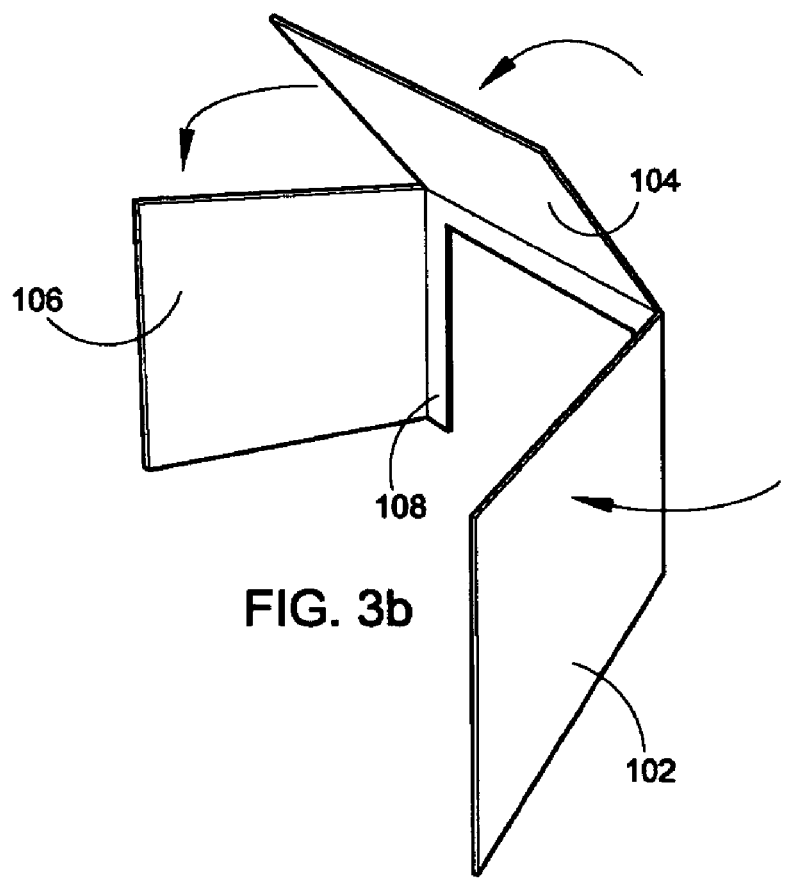
FIG. 3b illustrates the invention privacy device going from being splayed open to being packaged for non-use by rotation about the pivot points.

When the privacy device 100 is not in use, the sides 102, 104 and 106 are folded in on the attachment member 108, thereby being out of the way. This configuration is shown in FIG. 3b. Basically, each of the left side panel 106, right side panel 102 and top panel 104 are pivoted fully around their respective pivot points, 204, 200 and 202, until the panels are flush with the attachment member 108/display housing 6. For example, left side panel 106 is first fully rotated about pivot point 204 until the body of left panel 106 is in complete contact with the attachment member 108/display housing 6. Next, the top side panel 104 is similarly pivoted about pivot point 202 until the body of left side panel 106 is in complete contact with the body of previously pivoted left side panel 106. Finally, right side panel 102 pivots about pivot point 200 fully contacting the previously pivoted top side panel 104.

Figure 4A:
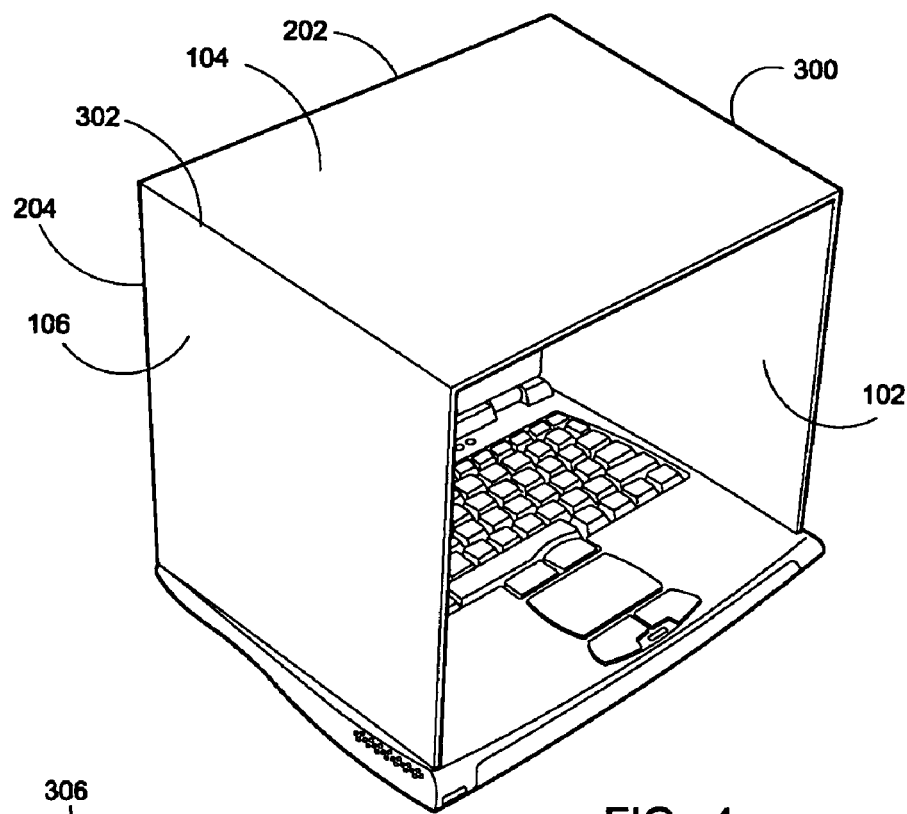
FIG. 4a illustrates the invention device when in use, but having a narrow work space.

In FIG. 4a, the privacy device 100 is shown attached to a laptop computer and having the right side, top side and left side panels 102, 104 and 106 employed to provide privacy. In this example configuration, the right side panel 102 is pivoted around the pivot point 200 (not shown) until the right side panel 102 is substantially perpendicular to the horizontal plane of the display housing 6. Right side panel 102 is held in place using a friction hinge at pivot point 200. Similarly, left side panel 106 is pivoted around the pivot point 204 until the left side panel 106 is substantially perpendicular to the horizontal plane of the display housing 6. Left side panel 106 is held in place using a friction hinge at pivot point 204. Top side panel 104 is pivoted around pivot point 202 until the top side panel is substantially perpendicular to the horizontal plane of the display housing 6. Once in this configuration, these left side, right side and top side panels are also in contact with each other, forming a right angle at the right side-top side junction 300 and at the left side-top side junction 302. In this configuration, there is provided a narrow work area into which the user inserts his or her arms to type on the keyboard. However, this configuration may be uncomfortable for the user, who will have to position his or her forearms more closely together in order to reach within the cavern created by the privacy device 100. Thus it is desirable that the left side panel and right side panel of the privacy device are adjustable about the lateral plane. Also in this configuration, the user's line of sight to the display 4 is obstructed because of the low positioning of top panel 104. In order to fully view the display 104 when the privacy device 100 is in this configuration, the user will have to angle the electronic apparatus 2 up towards his or her face. This is awkward. So, it is also desirable that the top side panel is adjustable about the horizontal plane.

Figure 4B:
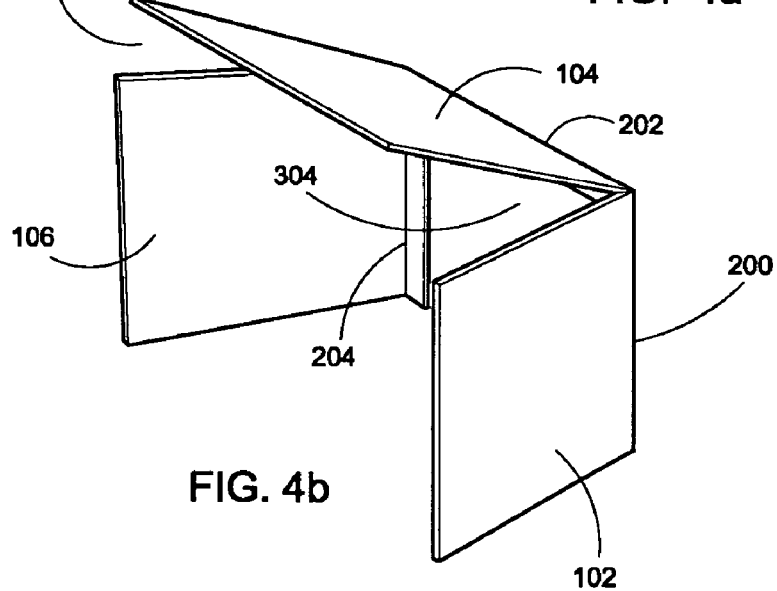
FIG. 4b illustrates the invention device when in use and having a wider work space, but having gaps that compromise privacy and shading.

In the preferred embodiment, shown in FIG. 4b, the right side panel 102, top side panel 104 and the left side panel 106 are partially pivoted about their respective pivot points 200, 202 and 204, and are held in place at angles that are obtuse to the horizontal plane of the display housing 6. By pivoting the left side and right side panels away from the keyboard 4, the user is given a greater workspace allowing the user's forearms to rest in a comfortable position while typing on the keyboard. In this configuration, junctions 300 and 302 do not form, and are instead replaced with gaps 304 and 306. Gaps 304 and 306 then compromise privacy and shading that is intended to be provided by the privacy device 100. For this reason, the current invention privacy device 100 comprises gap bridging means 400 and 402, shown in FIG. 5.

Gap bridging means 400 and 402 are preferably retractable panels. In this preferred embodiment, the gap bridging means 402 shown in FIG. 5b comprises a retraction housing 410, a retracting panel 412 and a latch means 414. By way of example only, the retraction housing 410 is described as being connected to the top side panel 104 and the latch means 414 is connected to the left side panel 106. The inverse arrangement is just as feasible, e.g., retraction housing 410 attached to left side panel 106 and latch means 414 is connected to top side panel 104. Latch means 414 can be hook and loop, snaps, clasps or other means well known to those of ordinary skill in the art. In this embodiment, the retracting panel 412 is pulled out of the retraction housing 410 and is secured to left side panel 106 using a latch means 414. Gap 306 is hereby filled in using the retraction housing 410, retracting panel 412 and latch means 414 as a gap bridging means 402. Gap 304 can be similarly filled with a gap bridging means 400 like that described for gap bridging means 402.

Gap bridging means 400 and/or 402 are alternatively hinged panels. In this embodiment, shown in FIG. 5c, a bridging panel 500 is attached to top side panel 104 using a hinge 502. The hinge 502 connection allows the bridging panel 500 to pivot around the connection axis formed between top panel 104 and the bridging panel 500 so that the panel can be positioned to cover gap 306. When the bridging panel 500 is not in use, e.g. when the privacy device is not in use or when there is no gap formed between the top and side panels, then the bridging panel 500 is rotated about hinge 502 until the bridging panel is position on top side panel 104. To use the bridging panel 500, the panel is rotated about hinge 502 so that the bridging panel moves from lying substantially flat on top of top side panel 104 to lying across gap 306 and resting on the upper edge of left side panel 106. Gap 306 is hereby filled by bridging panel 500, and gap 304 can be similarly filled.

When using a hinged bridging panel 500, as described above, the bridging panel 500 can be connected to left side panel 106 using hinge 502, and rotated to fill gap 306 accordingly. However, in this configuration, it is preferable that hinge 502 is a friction hinge so that the panel will stay in place when in contact with the left side edge of top side panel 104. When top side panel 104 is positioned higher than the hinge 502 bridging panel 500 may have a tendency to fall towards the left side panel 102, thereby re-opening gap 306. A friction hinge used for hinge 502 will keep bridging panel 500 in place. Alternatively, the hinge 502 can be a non-friction hinge and the bridging panel 500 and the top side panel 104 can have a complementary releasable attachment means such as hook and loop. Such a means will similarly prevent the problem described above.

Figure 5A:
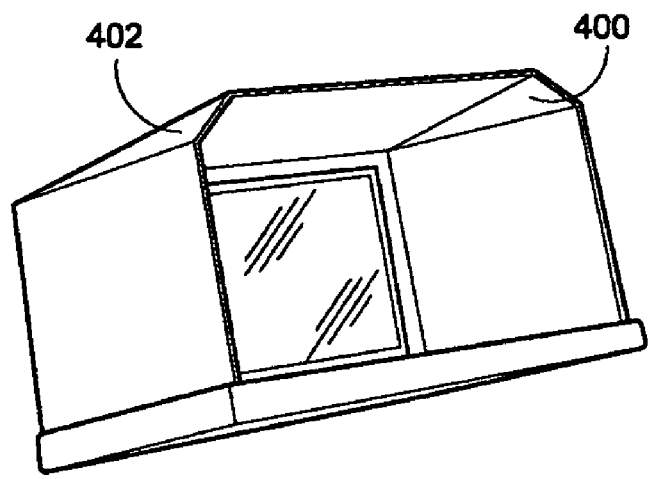
FIG. 5a illustrates the bridging of the gaps formed by adjustment of the panels.
Figure 5B:
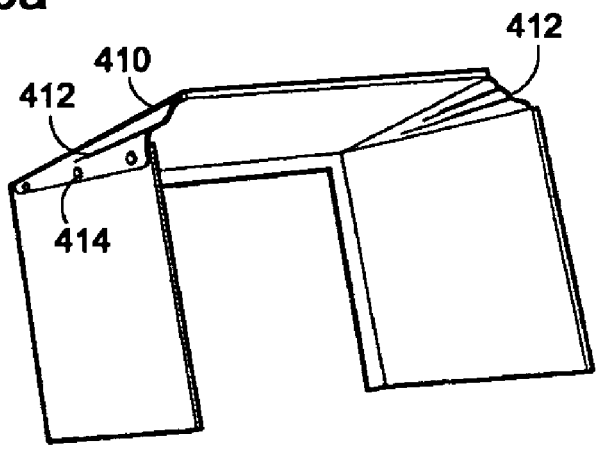
FIG. 5b is a close-up view of the gap formed between the right side panel and the top side panel and also illustrates a retractable panel used to bridge that gap.
Figure 5C:
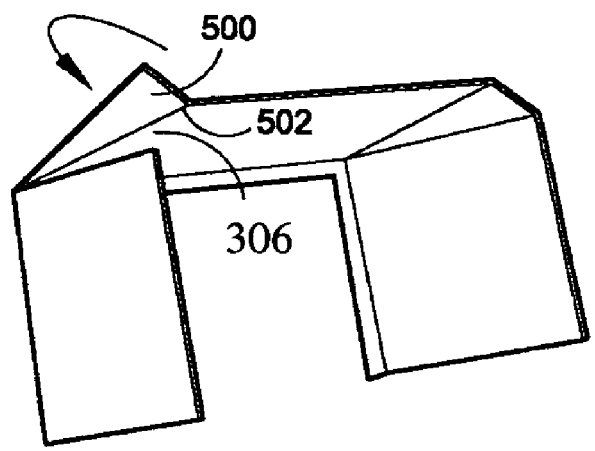
FIG. 5c is a close-up view of the gap formed between the right side panel and the top side panel and also illustrates a hinged panel used to bridge that gap.
Figure 5D:
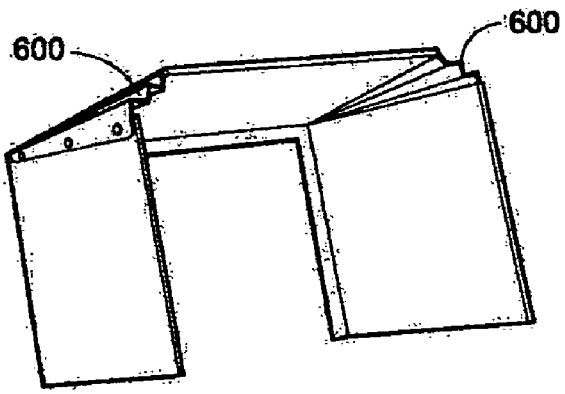
FIG. 5d is a close-up view of the gap formed between the right side panel and the top side panel and also illustrates an accordion-like structure used to bridge that gap.

In a still further embodiment, gaps 304 and 306 can be filled using a gap bridging means 400 and/or 402 that is an accordion-like structure, which is adjustable to continually bridge gaps 304 and 306 during positioning of the top and side panels. As seen in FIG. 5d, the gap bridging means 400 and 402 both comprise an accordion-like structure 600. Focusing on the accordion like structure 600 used as gap bridging means 402, it is seen that the accordion like structure attaches to both the left edge of top side panel 104 and the top edge of left side panel 106. Attachment to these edges can be removable attachment using, for example, hook and loop, snaps, clasps, and a tongue and groove-like sliding mechanism. Attachment to these edges can also be permanent; however it is preferable that only the edge of one panel is permanently attached to the accordion-like structure 600, while the other edge remains removably attached. The reason for this preference has to do with the maximum and minimum distances that gaps 304 and 306 can measure during use. Gaps 304 and 306 can be very large when the top side panel 104 and the right and left side panels 102 and 106 are horizontal to the plane of the display housing 6. Such a configuration is obtained when panels 102, 104 and 106 are being fully rotated about their respective pivot points 200, 202 and 204. Although it is preferable that one of the two attachments for a single accordinglike structure 600 (e.g., attached at the top side panel 104 and the left side panel 106; or attached at the top side panel 104 and the right side panel 102) remains removable, for the reasons stated, it is not necessary. Both of these attachments can be permanent and as such, accordion-like structure 600 is capable of spanning gaps 304 and 306 at their largest dimensions.

The dimensions of display housing 6 can vary for different laptops, and in order to meet these various dimensions, the privacy device 100 can be custom designed. Alternatively, the privacy device 100 can be adjustable, thereby universally fitting on laptops having a variety of dimensions.

Figure 6A:
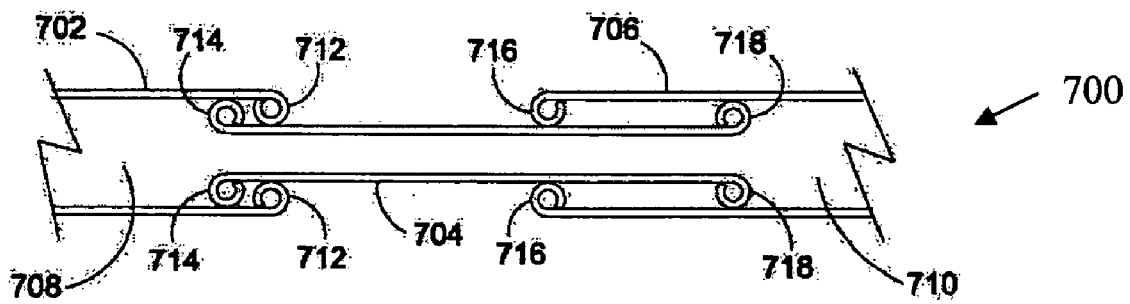
FIG. 6a is a cross-sectional view of a panel from the current invention privacy device highlighting one embodiment for making the panels adjustable.
Figure 6B:
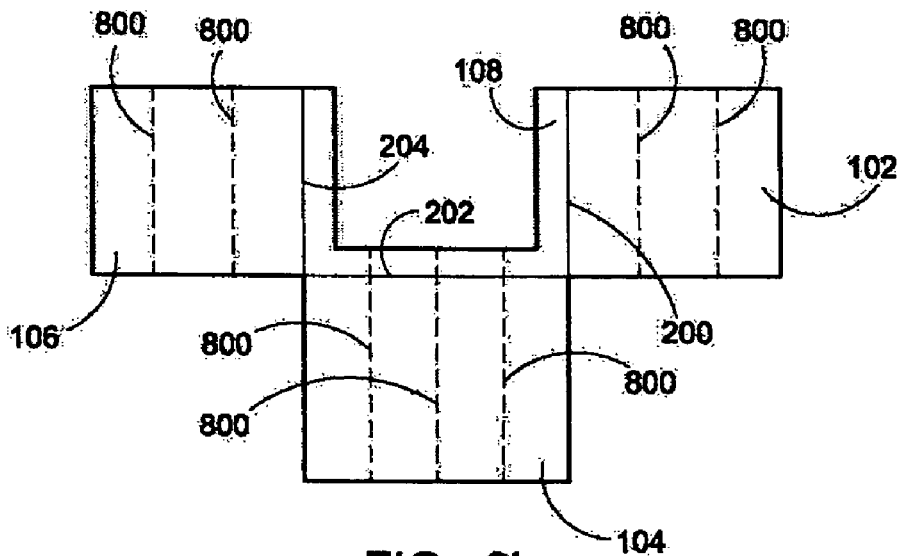
FIG. 6b illustrates the invention privacy device splayed open and shows adjustable means on the right side, left side and top side panels, as well as on part of the attachment member.

In one embodiment, the right side, left side and top panels 102, 106 and 104, respectively, are configured to each comprise adjustable extensions allowing for expanding or collapsing the panels. FIG. 6a shows a cross-sectional view of a panel having such a configuration. In FIG. 6a, the exemplary panel 700 comprises first segment 702, second segment 704 and third segment 706. First segment 702 has a hollowed interior chamber 708 in which second segment 704 is housed. Similarly, third segment 706 has a hollowed interior chamber 710 allowing for the housing of second segment 704. For illustration purposes, segment 704 is shown partially housed within segment 706, but is fully extended outside of segment 702. To prevent segments 702 and 704 and segments 706 and 704 for becoming disengaged during full extension outside of the housings 708 and 710, these segments are provided with a stopping means. In FIG. 6a the stopping means 712 on segment 702 is shown contact the stopping means 714 on segment 704 to prevent segment 704 from completely disengaging from segment 702. The stopping means 716 of segment 706 and 718 of segment 704 are not engaged because segment 704 is not fully extended outside of housing 710 of segment 706. Each panel comprising privacy device 100 can further comprise these adjustment means. FIG. 6b illustrates a privacy panel 100 splayed open so that the panels (left, right and top) and the attachment member are in the same plane. The privacy panel has a plurality of extension means 800 (depicted as dotted lines), that allow the privacy panel to extend for use with a variety of different sized laptop computers. Each of the panels can be adjusted to a preferred size using these extension means 800. For right side panel 102 and left side panel 106 the panels are extendable to protect more of the keyboard 8 in direction along the lateral plane 10. Top panel 104 is extendable to cover many different sized display housings 6. Extension of the top side panel 104 requires that the attachment member 108 accommodates this movement. As illustrated in FIG. 6b, the attachment member 108 is embodied as a border. In this preferred configuration, the extension means is shown on top panel 104, traversing pivot point 202 and continuing the proximate arm of the attachment means 108. When the top side panel 104 is extended or shortened using extension means 800, the section of attachment means 108 proximate the top side panel 104 must extend or shorten as well.

Figure 8A:
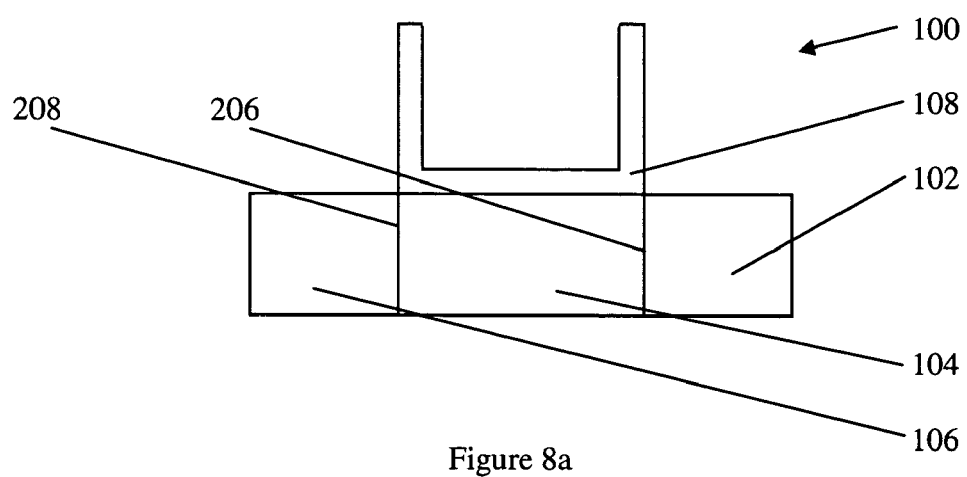
FIGS. 8a and 8b are views of an alternative embodiment of the invention privacy device wherein the side panels are attached to the top panels.
Figure 8B:
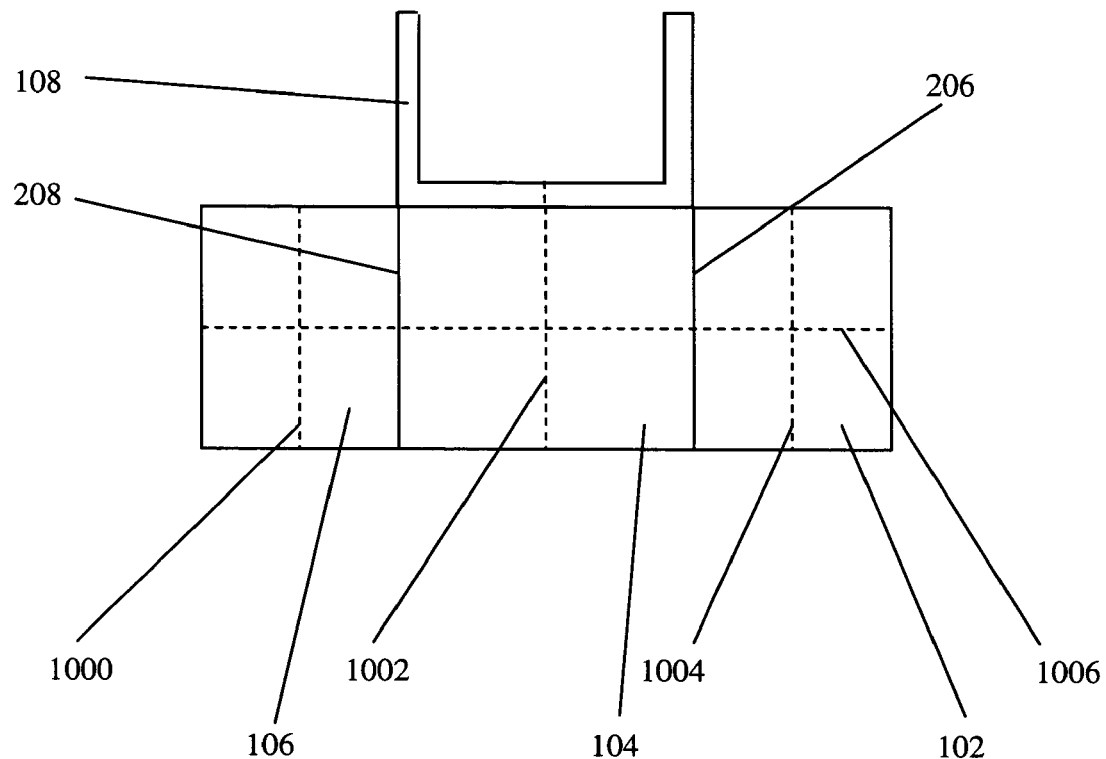

In an alternative embodiment there is provided a privacy device 100 that adjusts to fit a variety of dimensioned display housings. FIGS. 8a and 8b. In this embodiment, right side panel 102 is connected to top side panel 104, and similarly, left side panel 106 is connected to top side panel 102. As seen in FIG. 8a, only top panel 104 attached to attachment member 108 in this alternative embodiment. Thus, pivot points 200 and 204, seen in FIG. 3a, do not exist because right side panel 102 and left side panel 106 are not pivotally connected to the attachment member 108. Pivot point 202 remains present in this alternative embodiment. Right side panel 102 attaches to top side panel 104 at pivot point 206. Left side panel 106 attaches to top side panel 104 at pivot point 208. Preferably, pivot point 206 and pivot point 208 are friction hinges.

In this embodiment, the top panel 104 and the right side and left side panels 102 and 106, are adjusted to fit a variety of display housings 6 using a central slide rod that allows segments of the panels to slide longitudinally along the rod axis. In FIG. 8b, the slide rod 1006 is indicated as a dotted line running lengthwise through all of the panels 102, 104 and 106. The panels segments are as follows: right side panel 102 segments on each adjacent side of right panel segment joint 1004; top side panel 104 segments on each adjacent side of top panel segment joint 1002; and left side panel 106 segments on each adjacent side of left panel segment joint 1000. In this embodiment, wherein the attachment member 108 is connected to top side panel 104, the top panel segment joint 1002 also extends into attachment member 108, so that the size adjustment can occur.

In use, the privacy device 100 is attached to an electronic apparatus 2 as described above. The top side panel 104 is adjusted along the longitudinal axis of rod 1006 by moving the segments top panel 104 relative to each other at the segment joint 1002. The top side panel 104 is rotated around the pivot point 202, until it is in the user's desired position. The left side panels and the right side panel are then rotated around their respective pivot points 208 and 206 until they are in the desired position. The length of these right side and left side panels 102 and 106 can be adjusted, if desired, by moving the segments along the longitudinal axis of rod 1006 relative to segment joints 1000 and 1004.

One of ordinary skill in the art will readily construct the current invention privacy display to adjust using means other than those specifically described above. Such is with in the spirit of the current invention.

Figure 7A:
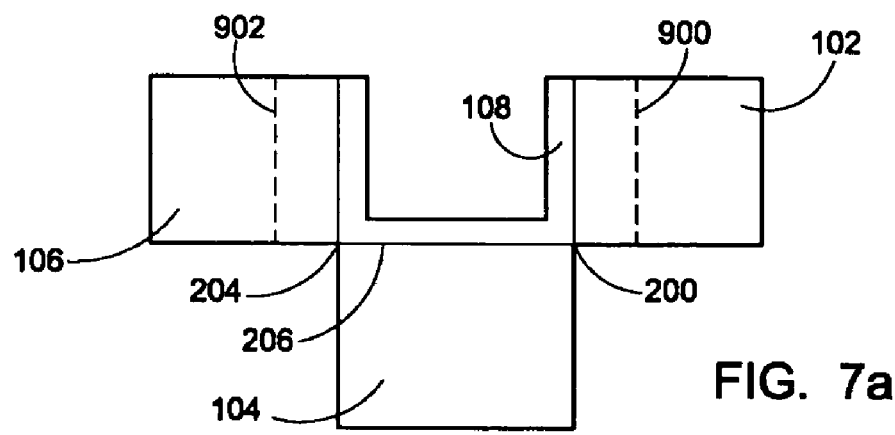
FIG. 7a shows the invention device splayed open and having a hinge within the body of the left side and right side panel.
Figure 7B:
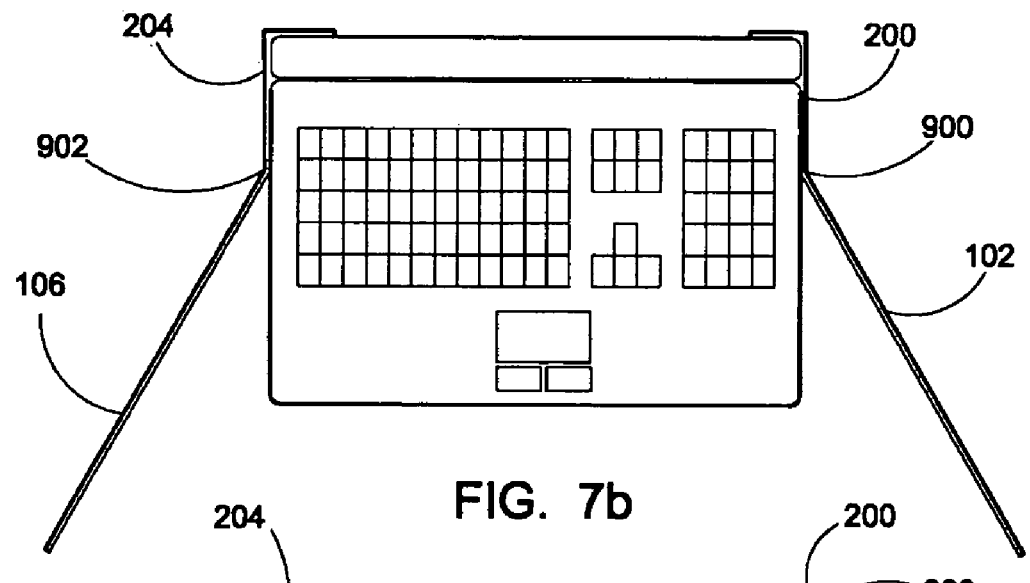
FIG. 7b and FIG. 7c, are both views looking down on the keyboard member of a laptop. These views both have the invention privacy device attached. The view is a cross-sectional view of the display housing so that the top panel could be removed form obstructing the illustration.
Figure 7C:
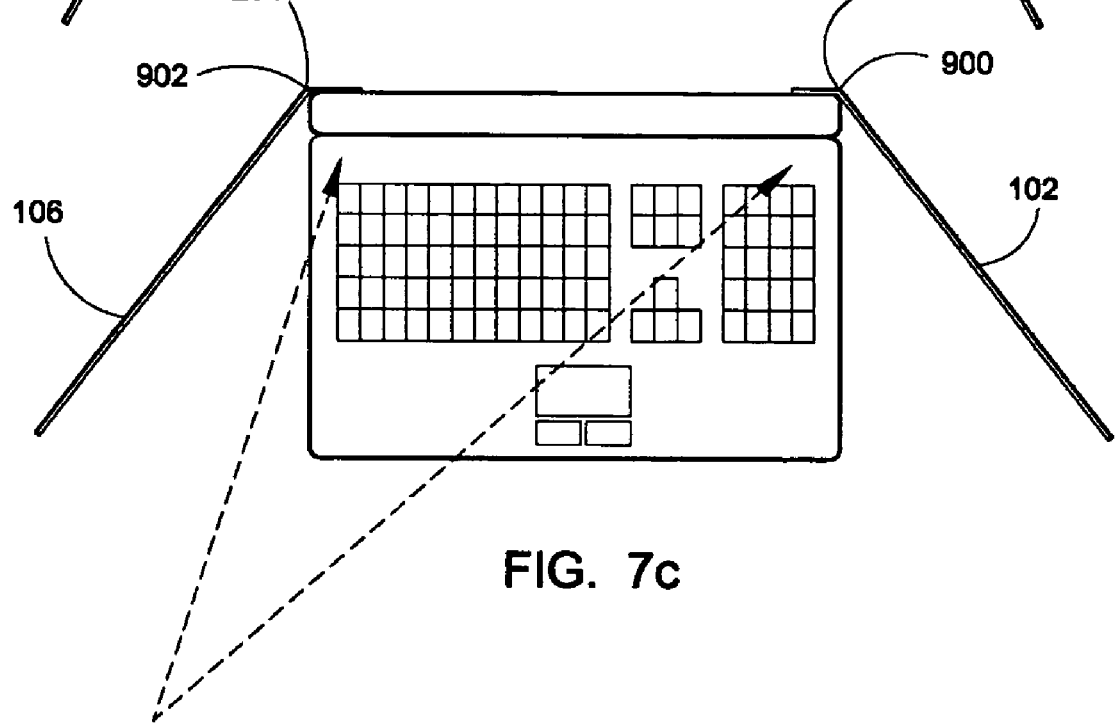

In another embodiment of the current invention privacy device 100, the right and left side panels 102 and 106 connect to the attachment member 108 at pivot points 200 and 204, respectively, and as described above. Unlike the preferred embodiment described above; however, the hinges 900 and 902 are located within the body of these panels 102 and 104. See FIG. 7a. This alternative embodiment allows for increased privacy from the side angles while providing additional room on the lateral plane for the user's hands and forearms while typing on the keyboard. As is shown in FIGS. 7b and 7c, the view of display 6 from the left side angle is significantly reduced in FIG. 7b having the hinges 900 and 902 within the body of side panels 102 and 106, respectively, compared to FIG. 7c having the hinges 900 and 902 at the pivot points 200 and 204. In this above alternative configuration there is also provided gap bridging means, as described above.

A method for providing privacy to an electronics apparatus comprising the steps of: attaching a privacy device to an electronics apparatus that has a display; adjusting a series of privacy panels to provide privacy to the display of the electronics apparatus; bridging a gap that forms between any two of the privacy panels when the privacy panels are adjusted according to a user's preferences, wherein the series of privacy panels are adjusted along a lateral plane and a horizontal plane to provide privacy to the display while providing viewability for the user and wherein placement of the privacy panels changes depending on the user's environment. In this method, a device is provided that delivers both adjustability to meet a user's need and privacy. The adjustability to meet the user's needs is dependant on the environment wherein the privacy device is being used and on how the user prefers to adjust the device to provide privacy in that environment. In the preferred embodiment, the privacy device comprises adjustable panels and a gap bridging means.

In the preferred embodiment, the user attaches the device to an electronics apparatus by aligning an attachment means on the privacy device with a complementary attachment means on the electronic apparatus. The attachment means can be one or more of a variety of attachment means well known in the art, including, but not limited to, hook and loop, snaps, clasps and adhesives. To make the attachment using hook and loop, the user will align the hook or loop member on the privacy device with the complementary member on the electronics apparatus.

Once attached, the user can adjust the series of privacy panels by pivoting the privacy panels along the lateral and the horizontal plane so that the privacy panels are located in a user defined position. Preferably, the series of privacy panels use friction hinges so that the panels will stay in place, but, other adjustment means are well known to those of ordinary skill in the art.

Adjustment of the panels forming the series of privacy panels can cause gaps to form between adjacent panels. This is a compromise in the privacy. In order to prevent and address the compromise in privacy, the user will employ one of many gap bridging means. Preferably, that gap bridging means is accomplished by pulling a retracting curtain from a retraction housing across a gap that forms between two adjacent panels and latching the retraction housing so that the gap has been bridged. Alternatively, that gap bridging means is accomplished by attaching an accordion-like structure to the proximate edges of two adjacent panels so that the gap that forms by adjusting the series of privacy panels is bridged. Further, that gap bridging means can be accomplished by rotating a bridging panel around a hinge so that the bridging panel lies across the gap that forms by adjusting the series of privacy panels and thereby bridges the gap. One ordinarily skilled in the art will readily provide other means for bridging this gap, and these means are well within the spirit of this current invention.

It is to be understood that the above description is intended to be illustrative, and not restrictive. Many other embodiments will be apparent to those of skill in the art upon reviewing the above description. For example, it should be noted that steps recited in any method claims below do not necessarily need to be performed in the order that they are recited. The scope of the invention should, therefore, be determined with reference to the appended claims, along with the full scope of equivalents to which such claims are entitled.

I claim:

1. A privacy device for use with an electronic apparatus having a display, the privacy device comprising:
   (a) adjustable privacy panels for protecting the display of the electronic apparatus;
   (b) an attachment member in contact with the privacy panels and attaching to the electronic apparatus;
   (c) an attachment means for securing the privacy device to the electronic apparatus; and
   (d) a gap bridging means to prevent compromises in privacy caused when the adjustable privacy panels are adjusted laterally about a substantially vertical axis,
   wherein the privacy device is attached to an electronic apparatus using the attachment means and the adjustable privacy panels are positioned according to the user's preference, thereby providing privacy or shading or both to the display of the electronic apparatus, and wherein the privacy is maintained despite adjustment of the privacy panels using the gap bridging means.

2. The device of claim 1 wherein the adjustable panels comprises a right side panel, a top side panel and a left side panel.

3. The device of claim 1 wherein the adjustable panels are pivotally attached to the attachment member.

4. The device of claim 1 wherein the adjustable panels are pivotally attached to the attachment member using a friction hinge.

5. The device of claim 1 wherein the attachment means is a removable attachment.

6. The device of claim 5 wherein the removable attachment comprises hook and loop, snaps, clasps and combinations thereof.

7. The device of claim 1 wherein the attachment means is a permanent attachment.

8. The device of claim 1 wherein the gap bridging means comprises a retractable panel, an accordion-like panel, or a bridging panel, or a combination thereof.

9. The device of claim 8 wherein the gap bridging means is a retractable panel further comprising a retraction housing, a retracting curtain and a latch means, wherein the retraction housing and the latch means are attached to neighboring panels and the retracting curtain is extended between the retraction housing and the latch means so as to act as a bridging means.

10. The device of claim 9 wherein the latch means comprises hook and loop, snaps, adhesives and clasps.

11. The device of claim 8 wherein the gap bridging means is an accordion-like structure further comprising attachment means wherein the attachment means connects the accordion-like structure to the top panel and one of either the right side panel or the left side panel so as to act as a bridging means.

12. The device of claim 11 wherein the attachment means comprises hook and loop, snaps, adhesives and clasps.

13. The device of claim 8 wherein the gap bridging means is a bridging panel comprising a hinge and a panel.

14. The device of claim 13 wherein the hinge is a friction hinge.

15. The device of claim 13 wherein the bridging panel further comprises an attachment means.

16. The device of claim 15 wherein the attachment means comprises hook and loop, snaps, clasps and adhesives.

17. The device of claim 1 wherein the adjustable panels can be extended and collapsed to fir a variety of different sized electronics apparatus.

18. The device of claim 17 wherein the panels comprise segments used for extending or collapsing the adjustable panels.

19. The device of claim 18 wherein the panels comprise a hollow interior, a segment panel fitting within the hollow interior, and a stopping means.

20. A method of providing privacy to a display of an electronic device using the privacy device of claim 1.

21. A method for providing privacy to an electronics apparatus comprising the steps of:
   (a) attaching a privacy device to an electronics apparatus that has a display;
   (b) adjusting laterally about a substantially vertical axis a series of privacy panels to provide privacy to the display of the electronics apparatus;
   (c) bridging a gap that forms between any two of the privacy panels when the privacy panels are adjusted according to a user's preferences,
   wherein the series of privacy panels to provide privacy to the display while providing viewability for the user and wherein placement of the privacy panels changes depending on the user's environment.

22. The method of claim 21 wherein the attaching step further comprises aligning an attachment means on the privacy device with a complementary attachment means on the electronic apparatus.

23. The method of claim 22 wherein the attachment means comprises hook and loop, snaps, claps and adhesives.

24. The method of claim 23 wherein the attachment means is hook and loop.

25. The method of claim 21, wherein the step of adjusting the series of privacy panels uses friction hinges.

26. The method of claim 21 wherein the series of privacy panels are adjusted to a user defined position to provide privacy.

27. The method of claim 21 wherein the step of bridging a gap further comprises pulling a retracting curtain from a retraction housing across a gap that forms between two adjacent panels and latching the retraction housing so that the gap has been bridged.

28. The method of claim 21 wherein the step of bridging a gap further comprises attaching an accordion-like structure to a plurality of proximate edges of two adjacent panels so that the gap that forms by adjusting the series of privacy panels is bridged.

29. The method of claim 21 wherein the step of bridging a gap further comprises rotating a bridging panel around a hinge so that the bridging panel lies across the gap that forms by adjusting the series of privacy panels and thereby bridges the gap.

* * * * *

UNITED STATES PATENT AND TRADEMARK OFFICE
CERTIFICATE OF CORRECTION

PATENT NO.           : 7,505,256 B2                                           Page 1 of 1
APPLICATION NO. : 11/450592
DATED                  : March 17, 2009
INVENTOR(S)         : Andrew Boudreau It is certified that error appears in the above-identified patent and that said Letters Patent is hereby corrected as shown below:

Column 1, line 42 - before the word "privacy" the word --of-- should be inserted;
Column 1, line 64 - the word "display" should be changed to "displayed";
Column 2, line 03 - before the word "privacy" the word --the-- should be inserted and after the word "privacy" the word "to" should be changed to "of";
Column 6, line 05 - before the word "keyboard" the word --the-- should be inserted;
Column 6, line 29 - before the word "this" the word --to-- should be inserted;
Column 7, line 33 - the word "point" should be changed to "points";
Column 7, line 38 - the word "know" should be changed to "known";
Column 9, line 42 - the word "according-" should be changed to "accordion-";
Column 10, line 4 - before the word "contact" the word --in-- should be inserted and after the word "contact" the word --with-- should be inserted;
Column 11, line 7 - the space between the words "with" and "in" should be removed.

Signed and Sealed this

Twenty-eighth Day of April, 2009

JOHN DOLL
*Acting Director of the United States Patent and Trademark Office*